United States Patent
Yokoi et al.

(10) Patent No.: US 10,703,417 B2
(45) Date of Patent: Jul. 7, 2020

(54) BODY FRAME STRUCTURE

(71) Applicants: Yoshimitsu Yokoi, Toyota (JP);
Shinichirou Murofushi, Toyota (JP);
Keisuke Suzuki, Toyota (JP); Yasunori Yamada, Hekinan (JP); Tetsuya Shinohara, Anjo (JP); Kenji Takada, Ama (JP); Shigeaki Kitamura, Ama (JP); Hironao Ito, Nagoya (JP)

(72) Inventors: Yoshimitsu Yokoi, Toyota (JP);
Shinichirou Murofushi, Toyota (JP);
Keisuke Suzuki, Toyota (JP); Yasunori Yamada, Hekinan (JP); Tetsuya Shinohara, Anjo (JP); Kenji Takada, Ama (JP); Shigeaki Kitamura, Ama (JP); Hironao Ito, Nagoya (JP)

(73) Assignees: TOYOTA JIDOSHA KABUSHIKI KAISHA, Toyota (JP); IIDA INDUSTRY CO., LTD., Inazawa (JP)

( * ) Notice: Subject to any disclaimer, the term of this patent is extended or adjusted under 35 U.S.C. 154(b) by 179 days.

(21) Appl. No.: 16/046,424

(22) Filed: Jul. 26, 2018

(65) Prior Publication Data
US 2019/0039658 A1 Feb. 7, 2019

(30) Foreign Application Priority Data
Aug. 2, 2017 (JP) .................. 2017-149833

(51) Int. Cl.
*B60J 7/00* (2006.01)
*B62D 25/04* (2006.01)
(Continued)

(52) U.S. Cl.
CPC ................ *B62D 25/04* (2013.01); *B32B 3/12* (2013.01); *B32B 3/28* (2013.01); *B32B 5/20* (2013.01);
(Continued)

(58) Field of Classification Search
CPC .......... H01L 2924/04941; H01L 2224/05187; B62D 25/025; B62D 25/04; B62D 25/081;
(Continued)

(56) References Cited

U.S. PATENT DOCUMENTS 5,609,385 A * 3/1997 Daniel ................ B60R 13/0206
280/751
5,720,510 A * 2/1998 Daniel ................ B60R 13/0206
280/751

(Continued)

FOREIGN PATENT DOCUMENTS

JP 2007-326376 A 12/2007
JP 2016-128306 A 7/2016

*Primary Examiner* — Kiran B Patel
(74) *Attorney, Agent, or Firm* — Oliff PLC

(57) ABSTRACT

A body frame structure forming a side part of an automobile includes an outer panel, an inner panel that forms a closed space elongated in a first direction between the inner panel and the outer panel, a metal outer R/F disposed within the closed space, a resin R/F disposed within the closed space, and a foam disposed within the closed space. The closed space includes a three-layer structure including the outer R/F, the resin R/F, and the foam filling a space between the outer R/F and the resin R/F.

6 Claims, 7 Drawing Sheets

(51) Int. Cl.
  *B62D 25/06*     (2006.01)
  *B62D 29/00*     (2006.01)
  *B32B 3/12*      (2006.01)
  *B32B 3/28*      (2006.01)
  *B32B 5/20*      (2006.01)
  *B32B 27/06*     (2006.01)
  *B32B 27/34*     (2006.01)
  *B32B 15/04*     (2006.01)

(52) U.S. Cl.
  CPC .......... *B32B 15/046* (2013.01); *B32B 27/065* (2013.01); *B32B 27/34* (2013.01); *B62D 25/06* (2013.01); *B62D 29/002* (2013.01); *B32B 2266/0271* (2013.01); *B32B 2266/0278* (2013.01); *B32B 2307/558* (2013.01); *B32B 2605/08* (2013.01)

(58) Field of Classification Search
  CPC .. B62D 29/002; B62D 29/001; B62D 21/157; B62D 25/00
  See application file for complete search history.

(56) References Cited

U.S. PATENT DOCUMENTS

| | | | | |
|---|---|---|---|---|
| 5,725,271 A * | 3/1998 | Patel | ................... | B60R 13/0206 280/751 |
| 6,467,834 B1 * | 10/2002 | Barz | ...................... | B62D 25/04 296/187.02 |
| 6,641,208 B2 * | 11/2003 | Czaplicki | ............... | B62D 25/04 296/187.02 |
| 8,491,047 B1 * | 7/2013 | Moll | ..................... | B62D 25/04 296/193.06 |
| 9,365,242 B1 * | 6/2016 | Yang | ..................... | B62D 25/04 |
| 9,580,110 B2 * | 2/2017 | Imada | ................... | B62D 25/04 |
| 2003/0057737 A1 * | 3/2003 | Bock | .................... | B62D 29/002 296/187.12 |
| 2003/0090129 A1 * | 5/2003 | Riley | ................... | B62D 21/152 296/203.03 |
| 2004/0104598 A1 * | 6/2004 | Barz | ...................... | B62D 25/04 296/187.02 |
| 2004/0130185 A1 * | 7/2004 | Hasler | .................. | B62D 29/002 296/193.06 |
| 2007/0063546 A1 * | 3/2007 | Lassl | .................... | B62D 25/04 296/193.06 |
| 2007/0090666 A1 * | 4/2007 | Brennecke | ............. | B60J 5/0451 296/146.6 |
| 2008/0061602 A1 * | 3/2008 | Czaplicki | ................ | B29C 70/70 296/205 |
| 2009/0085379 A1 * | 4/2009 | Takahashi et al. | .... | B62D 25/04 296/193.06 |
| 2010/0244492 A1 * | 9/2010 | Itakura | .................. | B62D 25/04 296/193.06 |
| 2010/0308623 A1 * | 12/2010 | Bodin | ................... | B62D 25/04 296/193.06 |
| 2012/0235442 A1 * | 9/2012 | Ezzat | .................. | B62D 29/002 296/187.02 |
| 2012/0313400 A1 * | 12/2012 | Balzer | ................... | B62D 25/04 296/193.06 |
| 2013/0313859 A1 | 11/2013 | Barz et al. | | |
| 2014/0050880 A1 * | 2/2014 | Nakayama | ............. | B29C 44/18 428/99 |
| 2015/0291218 A1 * | 10/2015 | Yoshida | ................. | B62D 25/04 296/187.12 |
| 2015/0354043 A1 * | 12/2015 | Bohner | ................... | C22C 21/08 148/695 |
| 2016/0046328 A1 * | 2/2016 | Steffens | ................ | B21D 47/01 296/193.06 |
| 2016/0257348 A1 * | 9/2016 | Balur | .................... | B62D 25/025 |
| 2017/0036701 A1 | 2/2017 | Yamada et al. | | |
| 2017/0073017 A1 * | 3/2017 | Steffens | ................ | B62D 29/00 |
| 2018/0029648 A1 * | 2/2018 | Von Watzdorf | ........ | B62D 25/04 |
| 2018/0043938 A1 * | 2/2018 | Tsuneyama | ............ | B62D 21/15 |
| 2018/0065681 A1 * | 3/2018 | Steffens | ................ | B62D 25/04 |
| 2018/0244231 A1 * | 8/2018 | Tanaka | ................. | B60R 21/0132 |
| 2019/0168812 A1 * | 6/2019 | Yamazaki | ............. | B21D 47/01 |
| 2019/0168813 A1 * | 6/2019 | Nakamoto | ........... | B62D 29/007 |
| 2019/0233019 A1 * | 8/2019 | Walch | .................. | B62D 21/157 |
| 2019/0248420 A1 * | 8/2019 | Caliskan | ................ | B62D 25/04 |

* cited by examiner

BODY FRAME STRUCTURE

CROSS REFERENCE TO RELATED APPLICATION

The disclosure of Japanese Patent Application No. 2017-149833 filed on Aug. 2, 2017 including the specification, claims, drawings, and abstract is incorporated herein by reference in its entirety.

TECHNICAL FIELD

The present disclosure relates to a body frame structure forming a side part of an automobile, and more particularly to a structure of a pillar or a rail that is a part of a body frame.

BACKGROUND

A side part of an automobile includes frames such as pillars extending in the height direction of the automobile and rails extending in the forward-rearward or lateral direction of the automobile. These pillars and rails each typically include an inner panel and an outer panel facing the inner panel to form a closed space between the outer panel and the inner panel. The entire pillar or rail thus has a hollow structure.

The pillar and the rail include, within an inner space (closed space), metal members for reinforcing the pillar and the rail. Patent Document 1 (JP 2007-326376 A), for example, discloses a pillar structure including metal reinforcements within a closed space.

FIG. 9 illustrates a pillar structure disclosed in Patent Document 1. As illustrated in FIG. 9, this pillar structure includes an outer panel 12 and an inner panel 14 that together form a closed section. This closed section includes an outer reinforcement (hereinafter abbreviated as an "outer R/F"; this abbreviation similarly applies to other members) 16 along the outer panel 12 and an inner R/F 18 along the inner panel 14. This pillar structure further includes an auxiliary R/F 40 along the outer R/F 16. The auxiliary R/F 40 is typically made of a metal, similar to the outer R/F 16 and the inner R/F 18.

CITATION LIST

Patent Literature

[Patent Document 1] JP 2007-326376 A

SUMMARY

Technical Problem

While the metal auxiliary R/F 40 provided to reinforce the outer R/F 16 or the inner R/F 18 increases the strength of the pillar or the rail, the metal auxiliary R/F 40 also increases costs and weight.

To enhance the rigidity of the outer panel 12 against side collision load in the pillar structure of Patent Document 1, all of the outer R/F 16, the auxiliary R/F 40, and the inner R/F 18 are bent at intermediate positions in the width direction to protrude toward the center in the thickness direction. This configuration causes the auxiliary R/F 40 and the inner R/F 18 to come close to each other at the intermediate positions in the width direction. However, in consideration of assembling properties of the auxiliary R/F 40 made of a metal, it is difficult to bring the auxiliary R/F 40 into full contact with the inner R/F 18, and some gap 42 always exists between the auxiliary R/F 40 and the inner R/F 18. This gap 42 facilitates deformation of the outer R/F 16 and the auxiliary R/F 40 when side collision load F is applied to the outer R/F 16 and the auxiliary R/F 40, which further causes sectional buckling in the outer R/F 16 and the auxiliary R/F 40.

Further, to provide the auxiliary R/F 40 made of metal to reinforce the inner R/F 18 or the outer R/F 16, it is necessary to spot-weld the auxiliary R/F 40 with the inner R/F 18 or the outer R/F 16. However, certain shapes of these R/Fs may prevent entry of a welding gun, making it difficult to weld the two R/Fs together.

As described above, a metal auxiliary R/F provided to reinforce the inner R/F or the outer R/F may cause various problems. The specification therefore discloses a frame structure of an automobile, capable of maintaining high strength of the body frame with a reduced amount of metal R/Fs.

Solution to Problem

A body frame structure in accordance with one aspect forms a side part of an automobile and includes an outer panel, an inner panel facing the outer panel to form a closed space elongated in a first direction between the inner panel and the outer panel, a first R/F made of a metal and disposed within the closed space, a second R/F made of a resin and disposed within the closed space, and a foam disposed within the closed space. The closed space includes, in at least a portion in the first direction, a three-layer structure. The three-layer structure includes the first R/F, the second R/F, and the foam filling a gap between the first R/F and the second R/F.

This structure reinforces the first metal R/F with the foam and the second resin R/F. The second R/F, which is made of resin, deforms in accordance with foaming deformation of the foam and can remain intimate contact with the foam after foaming of the foam. It is therefore possible to maintain high strength of the body frame with a reduced amount of metal R/F.

At least a portion of the closed space in the first direction may include a honeycomb structure having two or more segments separated by the three-layer structure.

The honeycomb structure further increases the strength of the body frame structure.

The inner panel and the outer panel may form a pillar extending in a height direction of the automobile. The body frame structure may further include a third R/F made of a metal and disposed within the closed space. In at least a portion of the closed space in the first direction, the third R/F may be disposed opposite the first R/F, with the foam being interposed between the third R/F and the first R/F.

The third metal R/F can further increase the strength of the body frame structure. The foam disposed between the first R/F and the third R/F allows the collision load applied to the third R/F to be supported, via the foam, by the first R/F immediately. This effectively reduces deformation and buckling of the third R/F.

In at least a portion of the closed space in the height direction in the above structure, the first R/F may have a cross section having a substantially hat shape with a center portion in a pillar width direction protruding toward the third R/F, and the foam may fill a gap between a top surface portion of the hat shape of the first R/F and the third R/F Deformation and buckling of the third R/F can be reduced more effectively by filling the gap between the first R/F and the third R/F with the foam.

In at least a portion of the closed space in the height direction in the above structure, the foam may have a cross section of a substantially hat shape that conforms to the first reinforcement, and the second R/F may cover a portion of an outer surface of the foam corresponding to a rising portion of the hat shape.

As the rising portions of the hat shape of the first R/F are covered with and reinforced by the foam and the rising portions of the hat shape of the foam are, in turn, covered with and reinforced by the second R/F, deformation and buckling of the rising portion of the first R/F can be effectively reduced, thereby reducing deformation of the pillar more reliably. In addition, the first R/F, having one surface covered with and reinforced by the foam, can have increased surface rigidity and increased resistance against the roof collision load.

The inner panel and the outer panel may form a rail extending in a forward-rearward direction of the automobile. In at least a portion of the closed space in the first direction, the first R/F may have a cross section of a substantially cup shape with a center portion in the rail width direction protruding toward the outer panel, and the foam and the second R/F may be disposed within a recess portion formed by the cup shape of the first R/F.

This structure reliably reinforces a portion where a welding gun cannot easily reach (inside a cup-shaped recess), such as inside of the cup-shaped recess of the first R/F, thereby increasing the strength of the rail.

Advantageous Effects of Invention

The body frame structure of the present disclosure reinforces the first metal R/F with the foam and the second resin R/F. The second R/F, which is made of resin, deforms in accordance with foaming deformation of the foam and can remain in intimate contact with the foam after foaming of the foam. It is therefore possible to maintain high strength of the body frame with a reduced amount of metal R/F.

BRIEF DESCRIPTION OF DRAWINGS

Embodiment(s) of the present disclosure will be described by reference to the following figures, wherein.

DESCRIPTION OF EMBODIMENTS

A body frame structure that forms a side part of an automobile will be described with reference to the drawings.

Figure 1:
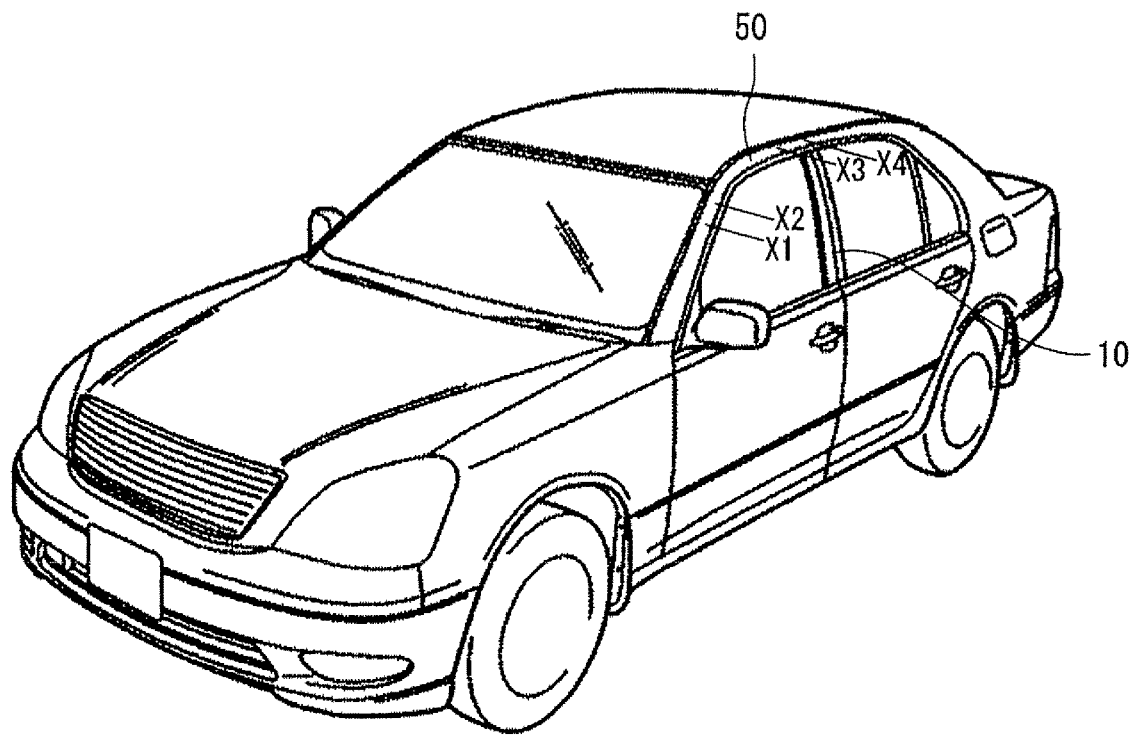
FIG. 1 is a perspective view of an automobile.

FIG. 1 is a perspective view of an automobile. A side part of an automobile includes, as a body frame structure, a pillar 10 elongated in a vehicle height direction and a rail 50 elongated in a forward-rearward or lateral direction of the vehicle.

Figure 2:
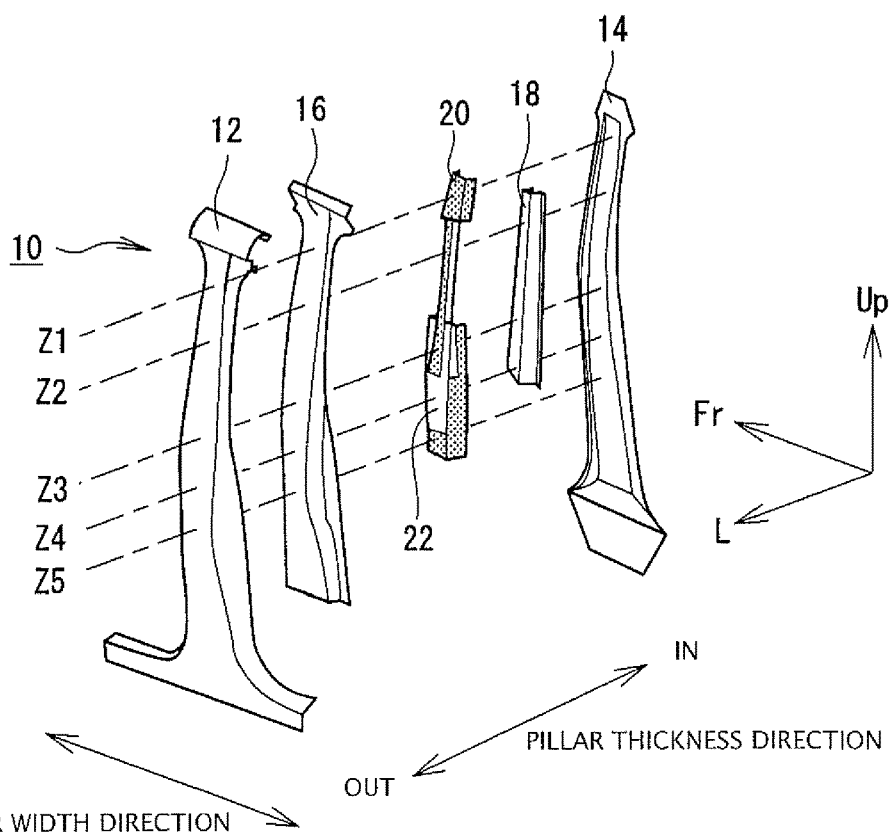
FIG. 2 is a schematic exploded perspective view of a pillar.
Figure 3:
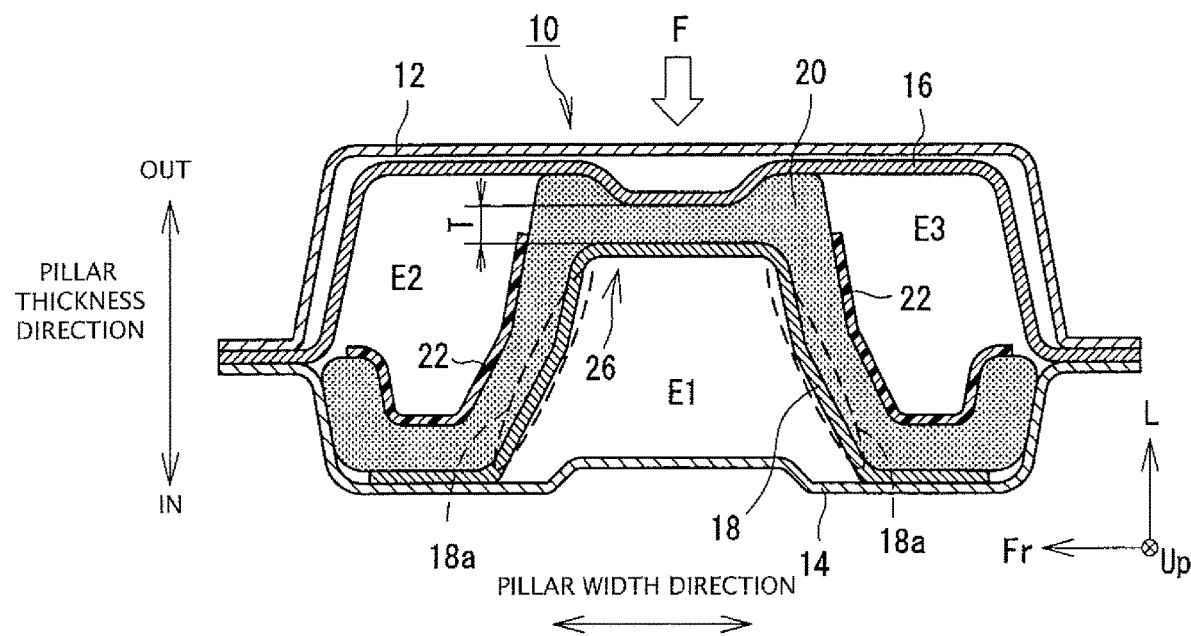
FIG. 3 is a cross sectional view of the pillar at height position Z3 in FIG. 2.

A structure of the pillar 10 will be described. FIG. 2 is a schematic exploded perspective view of the pillar 10. FIG. 3 is a cross sectional view of the pillar 10 at the most representative height position Z3, and FIG. 4 includes schematic cross sectional views of the pillar 10 at other height positions Z1, Z2, Z4, and Z5. In the following description, a direction orthogonal to the longitudinal direction (vehicle height direction) of the pillar 10 and to the thickness direction (vehicle width direction) of the pillar 10, that is, the lateral direction of the vehicle; that is, the left-right direction on the sheet in FIG. 3, will be referred to as the "pillar width direction."

The pillar 10 includes an outer panel 12 and an inner panel 14. The outer panel 12 has a horizontal cross section of a substantially hat shape opened inwardly in the vehicle width direction. The inner panel 14 is disposed opposite the outer panel 12 to form a closed space elongated in the height direction (hereinafter referred to as a "pillar space") between the inner panel 14 and the outer panel 12. End portions of the outer panel 12 in the pillar width direction and end portions of the inner panel 14 in the pillar width direction are opposed to each other and welded together.

A plurality of reinforcements are disposed within the pillar space to increase the strength of the pillar 10. Specifically, an outer R/F 16 (third R/F), an inner R/F 18 (first R/F), a foam 20, and a resin R/F 22 (second R/F) are disposed within the pillar space. The outer R/F 16 and the inner R/F 18 are metal reinforcements. The resin R/F 22 (second R/F) has a relatively high strength and is made of a resin which is deformable in accordance with foaming deformation of the foam 20, such as reinforced nylon, for example. The foam 20 is made of a thermosetting foam having high rigidity, such as an epoxy resin foam or a urethane foam. The foam 20 is installed in the pillar 10 before foaming and is heated during assembly of the pillar 10 or after completion of assembly of the pillar 10 for foaming deformation.

Figure 4:
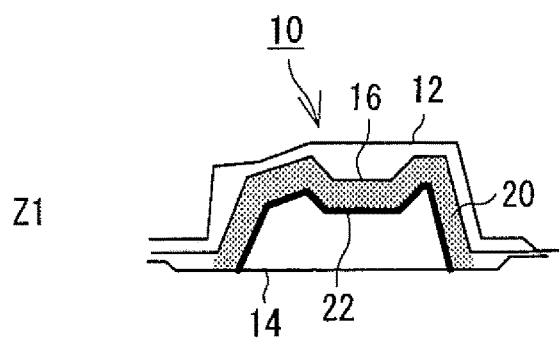
FIG. 4 schematically illustrates cross sections of the pillar at other height positions.
Figure 4:
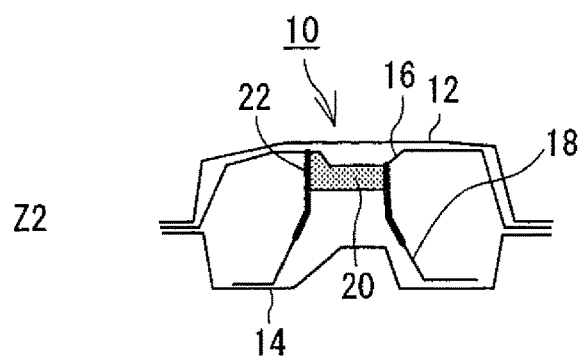
Figure 4:
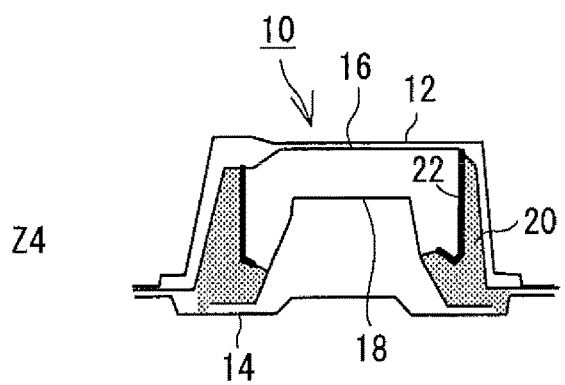
Figure 4:
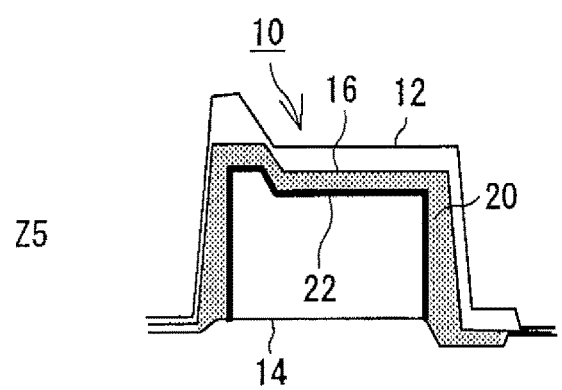

As clearly shown in FIG. 2 and FIG. 4, the arrangements and the horizontal cross sectional shapes of these reinforcements 16, 18, 20, and 22 vary depending on the height positions. In the following description, the structure of the pillar 10 at the most representative height position Z3 will be described with reference to FIG. 3.

At the height position Z3, the outer panel 12 has a horizontal cross section of a substantially hat shape opened inwardly in the vehicle width direction. The inner panel 14 has a horizontal cross section of a substantially hat shape opened outwardly in the vehicle width direction. The outer panel 12 and the inner panel 14 are welded together at both ends in the pillar width direction (corresponding to brim portions of the hat shape).

The outer R/F 16 has a shape corresponding to the outer panel 12; that is, a horizontal cross section of a substantially hat shape opened inwardly in the vehicle width direction. Both ends of the outer R/F 16 in the pillar width direction (corresponding to the brim portions of the hat shape) are interposed between the outer panel 12 and the inner panel 14 and welded together.

The inner R/F 18 is disposed inwardly of the outer R/F 16 in the vehicle width direction, and has a horizontal cross section of a substantially hat shape opened inwardly in the vehicle width direction. The length of the inner R/F 18 in the pillar width direction is shorter than the length of the inner panel 14 in the pillar width direction. Both ends of the inner R/F 18 in the pillar width direction (corresponding to brim portions of the hat shape) are welded to an inner surface of the inner panel 14 (corresponding to a top surface of the hat shape). Thus, a section E1 having a substantially trapezoidal cross section is formed between the inner R/F 18 and the inner panel 14.

The foam 20 is disposed to cover the outer surface of the inner R/F 18 in the vehicle width direction. Therefore, the foam 20, similar to the inner R/F 18, has a horizontal cross section of a substantially hat shape opened inwardly in the vehicle width direction. The foam 20, in a substantially sheet form before foaming, is attached to the inner R/F 18. Then, the pillar 10 is heated during assembly of the pillar 10 or after completion of assembly of the pillar 10, thereby foaming the foam 20.

The foam 20 has a thickness which is set to completely fill, after foaming, a gap between the top surface of the hat shape of the inner R/F 18 and the top surface of the hat shape of the outer R/F 16. Specifically, assuming that the distance of the gap between the top surface of the hat shape of the inner R/F 18 and the top surface of the hat shape of the outer R/F 16 is T, the thickness of the foam 20 is set to be less than T before foaming and T or greater after foaming.

The resin R/F 22 is disposed to cover rising portions of the hat shape of the foam 20. As illustrated in FIG. 2, the resin R/F 22 is fixed to the foam 20 before foaming so that the foam 20 and the resin R/F 22 are integrally formed as a single component. The resin R/F 22, which is deformable in accordance with foaming deformation of the foam 20, can remain in intimate contact with the foam 20 after foaming of the foam 20. In other words, the foam 20 fills a space between the inner R/F 18 and the R/F 22 when the pillar 10 is completely assembled. The interior of the pillar space includes a three-layer structure 26 in which the inner R/F 18, the foam 20, and the resin R/F 22 overlap in the thickness direction.

The three-layer structure 26 has a horizontal cross section of a substantially hat shape that is opened inwardly in the vehicle width direction. Portions of the three-layer structure 26 corresponding to brim portions of the hat shape are welded to the inner panel 14, and a portion of the three-layer structure 26 corresponding to the top surface of the hat is in intimate contact with the outer R/F 16. The pillar space is thus divided, by the three-layer structure 26, into three segments E1, E2, and E3 at a height position near the height position Z3; a honeycomb structure is formed within the pillar space.

Figure 9:
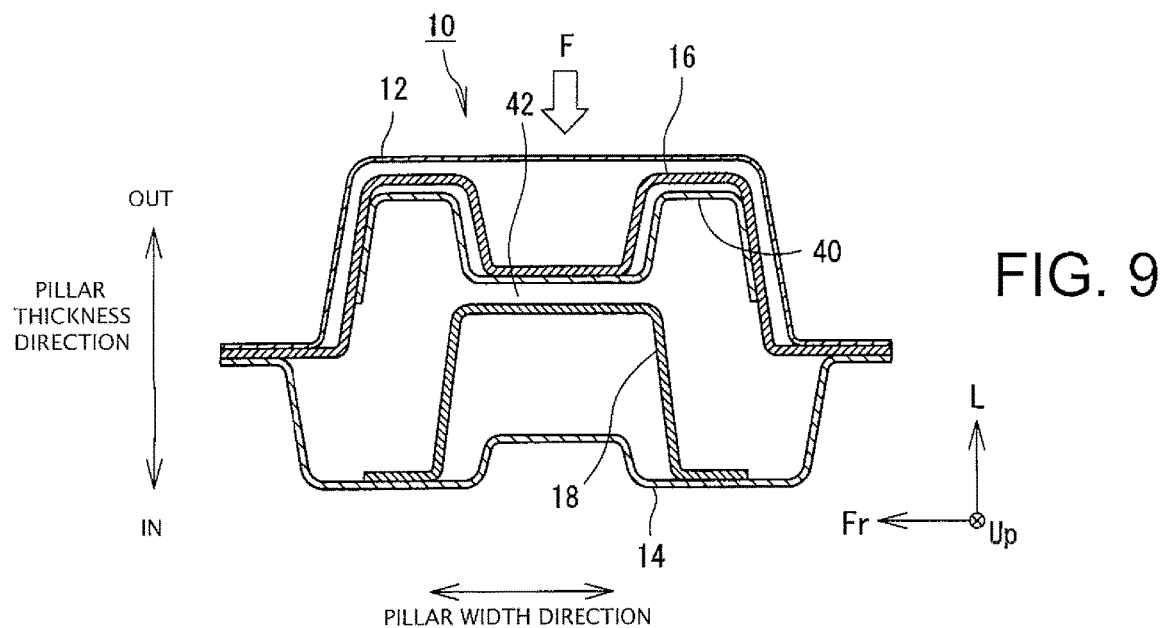
FIG. 9 is a cross sectional view of a pillar disclosed in Patent Document 1.

The structure of the pillar space in a portion in the longitudinal direction (around the height position Z3) as illustrated in FIG. 3 will be described in comparison with the related art. FIG. 9 is a horizontal cross section of the pillar 10 disclosed in Patent Document 1. The pillar 10 illustrated in FIG. 9 includes the outer panel 12 and the inner panel 14 facing each other. The pillar 10 further includes a pillar space having a substantially rectangular shape between the outer and inner panels 12 and 14. The pillar 10 further includes the outer R/F 16 made of a metal and the inner R/F 18 made of a metal within the pillar space. Assembling this structure requires some gap 42 between the outer R/F 16 and the inner R/F 18. This gap 42 allows easy assembly of the outer R/F 16 and the inner R/F 18 without interference between these R/Fs 16 and 18.

However, this gap 42 would cause deformation of the outer R/F 16 when a side collision load F is applied to the outer R/F 16, further causing the outer R/F 16 to experience buckling easily. To address this problem, it is proposed to further provide an auxiliary R/F 40 made of a metal along the outer R/F 16 within the pillar space. This auxiliary R/F 40 made of metal effectively prevents buckling of the inner outer R/F 16, thus increasing the strength of the pillar 10.

The metal R/F 40, however, further causes an increase in the costs and weight. The pillar 10 of the present embodiment therefore includes the three-layer structure 26 including the inner R/F 18, the foam 20, and the resin R/F 22, in place of the auxiliary R/F 40. This structure prevents an increase in the weight and costs and also enhances the strength of the pillar 10.

Specifically, the foam 20, when foamed and deformed, can easily come into intimate contact with another member (the outer R/F 16), and can therefore form a honeycomb structure by dividing the interior of the pillar space into a plurality of segments: segments E1, E2, and E3. The honeycomb structure further enhances the strength of the pillar 10.

More specifically, the foam 20, which fills the gap between the outer R/F 16 and the inner R/F 18, allows the outer R/F 16, when subjected to the side collision load F, to come into contact with the foam 20 immediately. The side collision load F received by the outer R/F 16 is then supported, via the foam 20, by the inner R/F 18. This effectively reduces deformation and buckling of the outer R/F 16.

However, buckling of rising portions 18a of the hat shape of the inner R/F 18, caused by the side collision load F, would deform the outer R/F 16. To reinforce the rising portions 18a of the hat shape of the inner R/F 18, the rising portions 18a of the hat shape are covered with and reinforced by the foam 20. As it is assumed that the foam 20 alone does not provide sufficient strength, the pillar 10 of the present embodiment further includes the resin R/F 22 which is in intimate contact with the foam 20 to reinforce the foam 20 and the inner R/F 18. While the foam 20 is foamed and deformed when heated, the resin R/F 22 can deform in accordance with the foaming deformation to maintain the intimate contact with the foam 20 after foaming of the foam 20, thereby reliably reinforcing the foam 20. This can reliably prevent buckling of the rising portions 18a of the hat shape of the inner R/F 18 and deformation of the pillar 10.

The pillar 10 may be under a roof collision load (a force in the vertical direction on the sheet in FIG. 3). The pillar 10 of the present embodiment includes the inner R/F 18 having one surface covered with and reinforced by the foam 20 and the resin R/F 22. This structure increases the surface rigidity of the inner R/F 18 and enhances resistance against the roof collision load, which further prevents deformation of the pillar 10.

Because both the foam 20 and the resin R/F 22 are lighter than the metal auxiliary R/F 40, the pillar 10 can have a lighter weight. For example, the total weight of the foam 20 and the resin R/F 22 can be about a half the weight of the metal auxiliary R/F 40.

Figure 5:
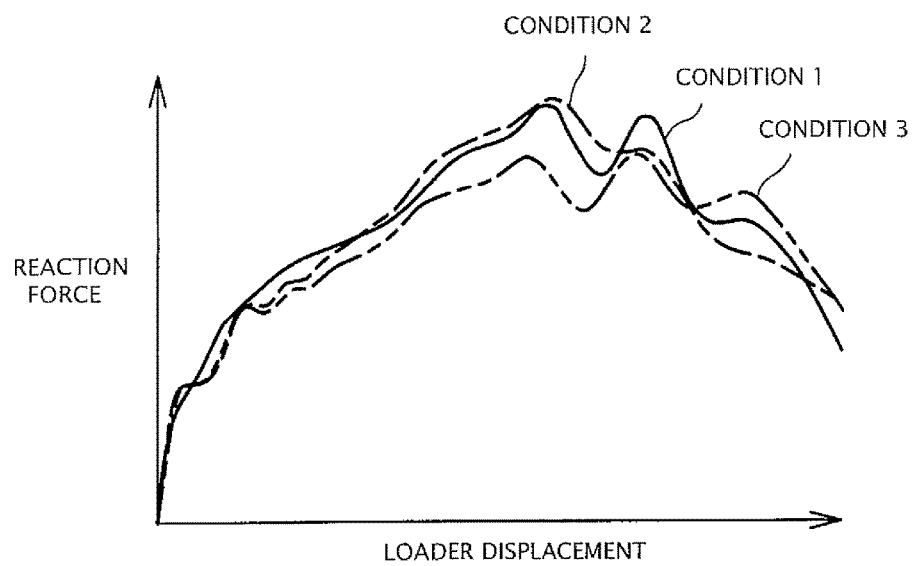
FIG. 5 is a graph showing results of strength check experiments with regard to side collision loads.
Figure 6:
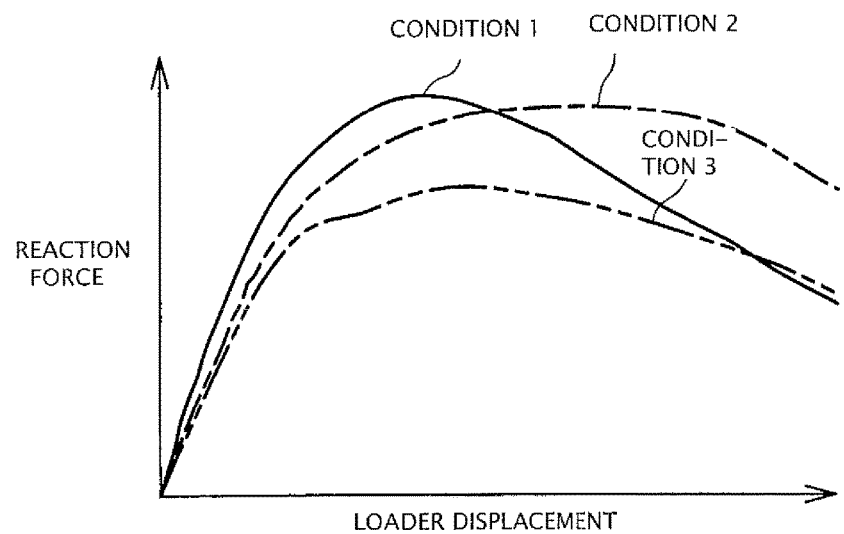
FIG. 6 is a graph showing results of strength check experiments with regard to roof collision loads.

Results of the strength tests will be described with reference to FIG. 5 and FIG. 6. FIG. 5 shows the results of strength tests against the side collision load, and FIG. 6 shows the results of the strength tests against the roof collision load. In FIG. 5, the horizontal axis indicates displaced positions of a loader pressing the pillar 10 laterally, and the vertical axis indicates the reaction force applied to the loader at that time. In FIG. 6, the horizontal axis indicates displaced positions of a loader pressing the pillar 10 from a top (roof) and the vertical axis indicates the reaction force applied to the loader at that time.

In FIG. 5 and FIG. 6, condition 1 (indicated by a solid line) shows test results of the pillar structure illustrated in FIG. 3; that is, a structure not including the metal auxiliary R/F 40 and including the foam 20 and the resin R/F 22. Condition 2 (indicated by a dashed and single-dotted line) shows test results of the conventional pillar structure illustrate in FIG. 9; that is, a pillar structure including the metal auxiliary R/F40. Condition 3 (indicated by a dashed and double-dotted line) shows test results of a structure including none of the auxiliary R/F40, the foam 20, and the resin R/F 22.

As clearly shown in FIG. 5, it can be understood that the structure under condition 3 not including the auxiliary R/F 40 nor the foam 20 has an entirely small reaction force; the maximum reaction force under condition 3 is lower than the maximum reaction forces under conditions 1 and 2 by about 10%. There is no significant difference in the reaction force between condition 2 and condition 2. In particular, it can be recognized that the maximum reaction force under condition 1 and the maximum reaction force under condition 2 are substantially the same. It can be understood from this fact that the structure under condition 1 including the foam 20 and the resin R/F 22 has substantially the same strength against the side collision load as the strength of the structure under condition 2 including the metal auxiliary R/F 40.

Similarly, as clearly shown in FIG. 6, it can be understood that the structure under condition 3 not including the auxiliary R/F 40 nor the foam 20 has an entirely small reaction force; the maximum reaction force under condition 3 is lower than the maximum reaction forces under conditions 1 and 2 by about 20%. There is no significant difference in the reaction force between condition 1 and condition 2. In particular, the maximum reaction force under condition 1 is slightly higher than the maximum reaction force under condition 2. It can be understood from this fact that the structure under condition 1 including the foam 20 and the resin R/F 22 has a strength against the side collision load which is substantially the same as or greater than the strength of the structure under condition 2 including the metal auxiliary R/F 40. As such, the structure illustrated in FIG. 3 can secure a strength similar to that of the structure including the metal auxiliary R/F 40 while avoiding an increase in the weight.

The pillar 10 need not include the structure illustrated in FIG. 3 along the entire length in the longitudinal direction of the pillar 10 (vehicle height direction) and may include this structure only in a portion along the longitudinal direction (around the height position Z3). The pillar 10 may therefore include a portion having no inner R/F 18 (around the height positions Z1 and Z5) or a portion with the foam 20 not covering the rising portions of the inner R/F 18 (around the height positions Z2 and Z4), as illustrated in FIG. 4.

Figure 7:
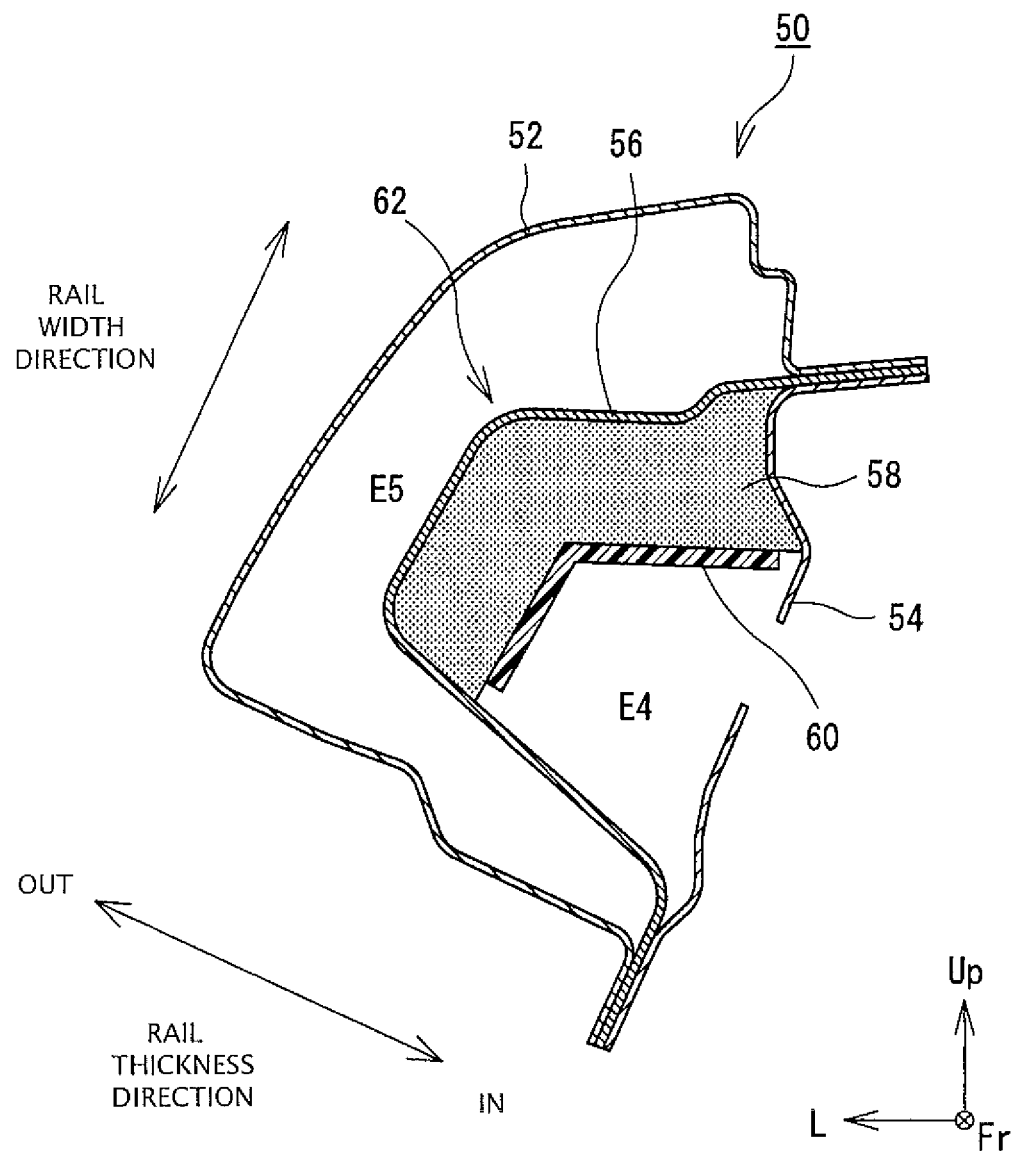
FIG. 7 is a cross sectional view of a rail at position X3 in FIG. 1.

The structure of the rail 50 will be described. The rail 50 is a body frame structure that forms, along with the pillar 10, a side part of an automobile. The rail 50 is elongated in the lateral direction of the vehicle. FIG. 7 is a cross sectional view at position X3 in FIG. 1. In the following description, the direction of the rail 50 in which an outer panel 52 and an inner panel 54 face each other will be referred to as a "rail thickness direction," and the direction orthogonal to this rail thickness direction and to the rail longitudinal direction will be referred to as a "rail width direction."

The rail 50, similar to the pillar 10, includes the outer panel 52 and the inner panel 54. The outer panel 52 has a horizontal cross section of a substantially cup shape opened inwardly in the vehicle width direction. The inner panel 54 is disposed opposite the outer panel 52 to form a closed space which is elongated in the vehicle lateral direction (hereinafter referred to as a "rail space") between the inner panel 54 and the outer panel 52. The ends of the outer panel 52 and the ends of the inner panel 54 in the rail width direction are opposed to each other and welded together.

The rail 50 includes, within the rail space, reinforcements to increase the strength of the rail 50. Specifically, the rail 50 includes, in the rail space, a metal rail R/F 56 (first R/F), a foam 58, and a resin R/F 60 (second R/F). The resin R/F 60 includes a resin which has a relatively high strength and is deformable in accordance with foaming deformation of the foam 58, such as reinforced nylon. The foam 58 includes a thermosetting high rigidity foam, such as urethane foam. The foam 58 is installed, before foaming, into the rail 50, and is heated and foamed during assembly of the rail 50 or after completion of assembly of the rail 50.

The arrangements and cross-sectional shapes of the rail R/F 56, the foam 58, and the resin R/F 60 vary depending on the positions in the rail longitudinal direction. In the following description, the rail structure at the most representative position will be described with reference to FIG. 7.

At the representative position, the outer panel 52 has a cross section of a substantially cup shape opened inwardly in the vehicle width direction. The inner panel 54 has a cross section of a substantially cup shape opened outwardly in the vehicle width direction. The outer panel 52 and the inner panel 54 are welded together at their ends in the rail width direction.

The rail R/F 56 has a cross section having a substantially cup shape opened inwardly in the vehicle width direction. End portions of the R/F 56 in the rail width direction are interposed between the outer panel 52 and the inner panel 54 and welded.

The foam 58 is in intimate contact with the surface of the rail R/F 56 facing inwardly in the vehicle width direction. Further, the resin R/F 60 is in intimate contact with the surface of the foam 58 facing inwardly in the vehicle width direction. In other words, the rail space includes a three-layer structure 62 having the rail R/F 56 and the resin R/F 60 with the foam 58 filling the gap between the rail R/F 56 and the resin R/F 60. The rail space is divided by this three-layer structure 62 into two segments: segment E4 and segment E5. The resin R/F 60 is attached to the foam 58 before foaming, and the foam 58 having the resin R/F 60 attached thereto is then attached to the rail R/F 56 before foaming. During or after completion of assembly of the rail 50, the rail 50 is heated to foam and deform the foam 58. The resin R/F 60, which has flexibility to follow the foaming deformation of the foam 58, can remain in intimate contact with the foam 58 even after the foam 58 is foamed.

Figure 10:
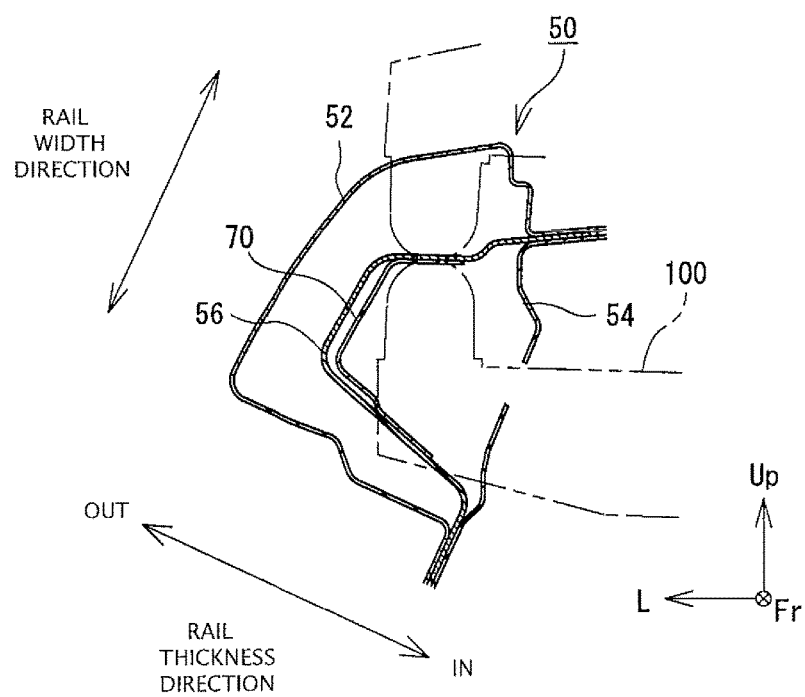
FIG. 10 is a cross sectional view illustrating an example conventional rail.

The structure of the rail space in a portion in the longitudinal direction of the rail as illustrated in FIG. 7 will be described in comparison with the related art. FIG. 10 is a cross sectional view illustrating an example conventional rail 50. The rail 50 includes the outer panel 52 and the inner panel 54 facing each other. The rail 50 further includes a rail space of a substantially rectangular shape between the outer and inner panels 52 and 54. The rail 50 further includes the rail R/F 56 made of metal within the rail space. As the rail R/F 56 alone does not provide sufficient strength, it has been proposed to further dispose a metal auxiliary R/F 70 to reinforce the metal rail R/F 56. The auxiliary R/F 70 has a cross section of a substantially cup shape conforming to the rail R/F 56, and is disposed within the recess portion formed by the rail R/F 56 having a substantially cup shape. It is desirable that the end portions of the auxiliary R/F 70 in the rail width direction are welded to the rail R/F 56.

As described above, the auxiliary R/F 70 is disposed within the recess portion formed by the rail R/F 56. Some types of vehicles may include the recess portion of the rail R/F 56 having a width smaller than the tip portion of a welding gun 100. The tip portion of such a welding gun 100 cannot be inserted into the recess portion of the rail R/F 56, resulting in failure to weld the auxiliary R/F 70.

The rail 50 of the present embodiment includes the foam 58 and the resin R/F 60, in place of the metal auxiliary R/F 70, to reliably reinforce the rail R/F 56 irrespective of the shape of the rail R/F 56. The foam 58 and the resin R/F 60, which can be attached to the rail R/F 56 without using a welding gun, can be easily disposed within the recess portion of the rail R/F56 irrespective of the shape of the rail R/F56, to thereby easily reinforce the rail R/F56.

Use of the foam 58 and the resin R/F 60, in place of the metal auxiliary R/F 70, to reinforce the rail R/F 56 significantly reduces weight and cost. For example, the total weight of the foam 58 and the resin R/F 60 can be reduced to about 65% of the weight of the auxiliary R/F 70.

As described above, the rail 50, including the three-layer structure 62 composed of the metal rail R/F 56, the foam 58, and the resin R/F 60, similar to the pillar 10, can sufficiently secure the strength of the rail 50 without including the metal auxiliary R/F 70.

Figure 8:
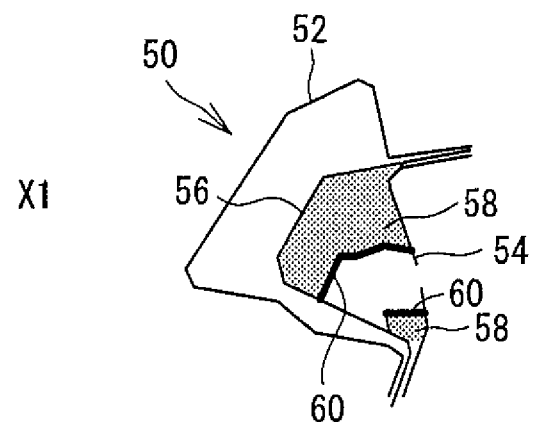
FIG. 8 illustrates cross sections of the rail at other positions.
Figure 8:
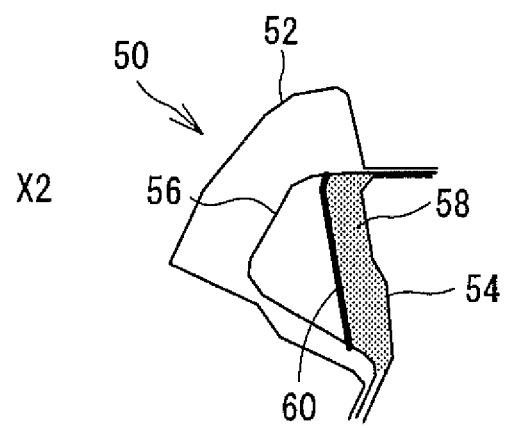
Figure 8:
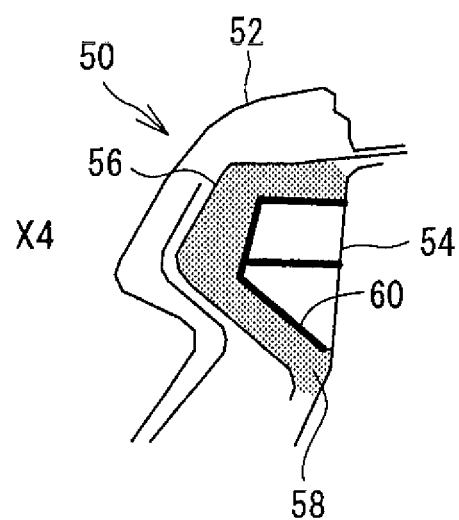

The rail 50 may include the structure illustrated in FIG. 7 only along a partial length in the longitudinal direction of the rail 50 (around position X3) rather than along the entire length in the longitudinal direction (lateral direction of the vehicle). Therefore, the rail 50 may include a portion in which the inner panel 54, the foam 58, and the resin R/F 60 are layered (around position X2) and a portion in which the foam 58 is disposed around the corner between the rail R/F 56 and the inner panel 54 (around position X1), for example, as illustrated in FIG. 8.

In any case, as the body frame structure forming the side part of an automobile includes, within the inner space, a three-layer structure having a foam interposed between the first R/F made of a metal and the second R/F made of a resin, the strength of the body frame can be kept high with reduced weight and cost.

The invention claimed is:

1. A body frame structure forming a side part of an automobile, the body frame structure comprising:
an outer panel;
an inner panel facing the outer panel to form a closed space elongated in a first direction between the inner panel and the outer panel;
a first reinforcement made of a metal, the first reinforcement being disposed within the closed space;
a second reinforcement made of a resin, the second reinforcement being disposed within the closed space; and
a foam disposed within the closed space,
the closed space including, in at least a portion in the first direction, a three-layer structure including the first reinforcement, the second reinforcement, and the foam filling a gap between the first reinforcement and the second reinforcement.

2. The body frame structure according to claim 1, wherein
at least a portion of the closed space in the first direction includes a honeycomb structure having two or more segments separated by the three-layer structure.

3. The body frame structure according to claim 1, wherein
the inner panel and the outer panel form a pillar extending in a height direction of the automobile,
the body frame structure further comprises a third reinforcement made of a metal, the third reinforcement being disposed within the closed space, and
in at least a portion of the closed space in the first direction, the third reinforcement is disposed opposite the first reinforcement, with the foam being interposed between the third reinforcement and the first reinforcement.

4. The body frame structure according to claim 3, wherein
in at least a portion of the closed space in the height direction,
the first reinforcement has a cross section having a substantially hat shape with a center portion in a pillar width direction protruding toward the third reinforcement, and
the foam fills a gap between a top surface portion of the hat shape of the first reinforcement and the third reinforcement.

5. The body frame structure according to claim 4, wherein
in at least a portion of the closed space in the height direction,
the foam has a cross section of a substantially hat shape that conforms to the first reinforcement, and
the second reinforcement covers a portion of an outer surface of the foam corresponding to a rising portion of the hat shape.

6. The body frame structure according to claim 1, wherein
the inner panel and the outer panel form a rail extending in a forward-rearward direction of the automobile,
in at least a portion of the closed space in the first direction, the first reinforcement has a cross section of a substantially cup shape with a center portion in the rail width direction protruding toward the outer panel, and
the foam and the second reinforcement are disposed within a recess portion formed by the cup shape of the first reinforcement.

* * * * *